Patented Mar. 19, 1929.

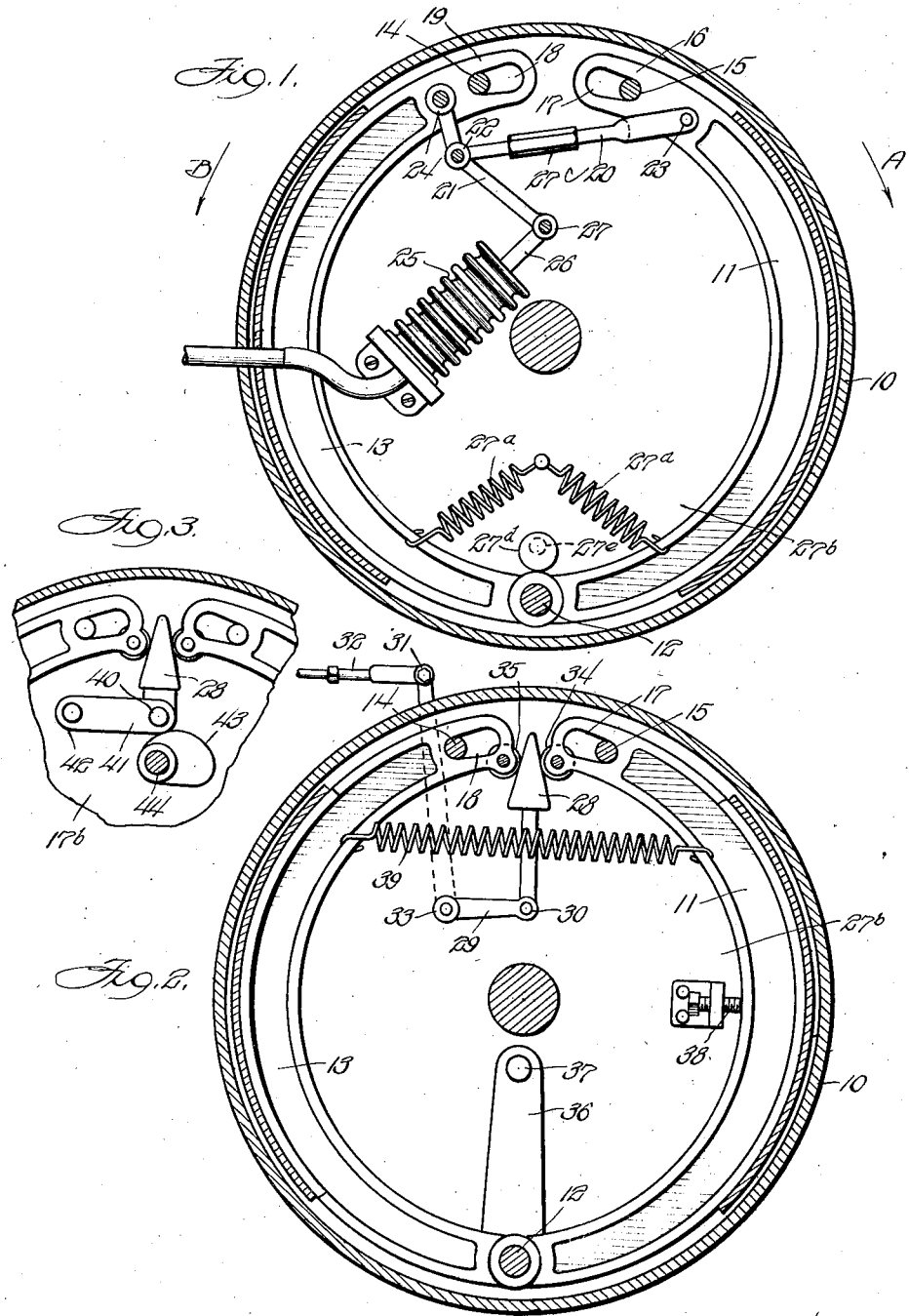

1,705,855

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE CONSTRUCTION.

Application filed October 8, 1924. Serial No. 742,282.

My invention relates to brake construction.

One of the objects of my invention is to provide an internal brake of the shoe type which will be self-energizing to a great extent in both directions of rotation of the brake drum.

A further object of my invention is to provide an improved hydraulic means for actuating a brake of this type.

Further objects will appear from the description and claim.

In the drawings in which two embodiments of my invention are shown—

Figure 1 is a side elevational view, partly in section, showing a toggle transmission and a corrugated metal hydraulic actuator;

Fig. 2 is an elevation, partly in section, showing a wedge and link transmission; and Fig. 3 is a fragmentary view showing a different form of wedge-actuating mechanism.

Referring first to Fig. 1, this shows a brake construction in which the two brake shoes 11 and 13 are so mounted that when the brake drum 10 is rotating in the direction of the arrow A, the brake shoe 11 will be in effect pivoted to swing about its point of connection 12 with the brake shoe 13 and the brake shoe 13 will be in effect pivoted to swing about the fixed pivot pin 14 and so that when the brake drum 10 is rotated in the opposite direction indicated by the arrow B, the brake shoe 13 will in effect swing about the pivotal connection 12 and the brake shoe 11 will in effect swing about the fixed pivot pin 15. This double action of the brake shoes is accomplished by providing a loose connection between the two shoes 11 and 13 and their respective pivot pins 15 and 14 so that when the brake drum rotates in the direction indicated by the arrow A, the end 16 of the brake shoe 11 will have freedom of movement to swing about the pivotal connection 12 into engagement with the inner surface of the brake drum 10, and so that when the brake drum 10 is rotated in the opposite direction, indicated by the arrow B, the brake shoe 13 will have freedom of movement to swing about the pivot 12 into engagement with the brake drum. This loose connection is effected by providing the ends of the brake shoes 11 and 13 with enlarged openings 17 and 18 to receive the pivot pins 15 and 14.

Due to this construction, the brake shoes will be self-energizing to a great extent, no matter in which direction the brake drum is rotated. For forcing the brake shoe ends 16 or 19, respectively, of the brake shoes outwardly into engagement with the brake drum, a pair of links 20 and 21 are provided, pivotally connected together at 22 and pivotally connected to the brake shoes at 23 and 24. These two links form in effect a toggle which is actuated by the corrugated flexible metal hydraulic actuator 25, the plunger 26 of which is pivotally connected at 27 to the link 21.

A pair of springs 27$^a$ are provided which aid in returning the shoes to the relieved position and also draw these shoes over toward the backing plate 27$^b$ to prevent rattling. A turnbuckle 27$^c$ is provided on the link 20 to adjust its length. An adjustable stop is provided to limit the relieving motion of the brake shoes, in the form of an eccentric 27$^d$ having a stem 27$^e$ which passes through the backing plate and can be turned to vary the distance which the brake shoes will be from the brake drum in the relieved position.

The construction shown in Fig. 2 is substantially the same as that just described, except that here a wedge 28 is provided for forcing one or the other of the ends of the brake shoes into engagement with the brake drum. This wedge may be actuated by means of a bell-crank lever 29 pivotally connected at 30 with the wedge and pivotally connected at 31 with the reach rod 32. This bell-crank lever is mounted to move about the pivot pin 33. If desired, a pair of anti-friction rollers 34 and 35 may be mounted on the ends of the brake shoes 11 and 13 in position to be engaged by the wedge 28.

The pivot 12 between the brake shoes 11 and 13 may be swung on a pendulum link 36 pivoted at 37 to the backing plate 27$^b$. This guides the pivotal point of connection 12 between the brake shoes causing it to move in a definite path. An adjustable stop 38 is provided to locate the brake shoe 11 in its relieved position. A return spring 39 is provided to move the brake shoes to relieved position.

As shown in Fig. 3, the construction shown in Fig. 2 may be modified so that the brake may be actuated by a cam. In this construction, the wedge 28 is pivotally connected at 40 to a swinging arm 41. This arm 41 is pivoted at 42 to the backing plate, and is actuated by means of a cam 43 which also is pivoted to the backing plate at 44.

In operation, referring first to Fig. 1, assuming that the brake drum is rotated in the direction of the arrow A when fluid pressure is applied, the corrugated flexible metal actuator 25 is elongated, and acts on the toggle links 20 and 21 in a manner tending to force the ends 16 and 19 of the brake shoes away from each other. The rotation of the brake drum, however, holds the brake shoe 13 in snug engagement with the pivot pin 14 and tends to disengage the brake shoe 11 from its pivot pin 15, allowing freedom of motion of this brake shoe 11 to swing outwardly into engagement with the rotating brake drum. Due to the friction between the brake shoes and the brake drum, throughout the entire extent of the brake shoes, there results a piling up of the braking effect, so that the brake shoes are, what is termed, "self-energizing" throughout their entire extent. Similarly, when the brake drum is rotated in the direction indicated by the arrow B, and fluid pressure is applied to the hydraulic actuator, the brake shoe 11 is held snugly in engagement with its pivot pin 15 but the friction between the brake drum 10 and the brake shoe 13 tends to disengage the brake shoe 13 from its pivot pin 14 to give it freedom of movement to move outwardly into engagement with the brake drum, so that the brake shoes will be self-energizing throughout their entire extent in this direction of rotation also.

The operation of the construction shown in Figs. 2 and 3 is the same as that just described, so far as the operation of the brake drum 10 and the brake shoes 11 and 13 are concerned.

Having thus described my invention, what I claim as new and desire to secure by Letters Patent of the United States is:—

Brake mechanism having, in combination, a drum, at least three shoe supporting members positioned within the drum, two hinged brake shoes mounted upon said supporting members within the drum for floating movement thereover, one shoe adapted to energize the other, one supporting member being adjustable radially of the drum and engaging said shoes in supporting relationship to their hinged connection, said shoes having opposed separated free ends which are slotted, said other two supporting members positioned one in supporting relationship within the slot of one shoe and the other in supporting relationship within the slot of the other shoe, each adapted to guide the shoes in their floating movement and to engage the shoe supported thereby to anchor said shoes against rotation with the drum in one direction, and actuating mechanism engaging the free ends of the two shoes to force them against the drum.

In witness whereof, I have hereunto subscribed my name.

ADIEL Y. DODGE.